United States Patent [19]

Resnick

[11] Patent Number: 5,523,757
[45] Date of Patent: Jun. 4, 1996

[54] SIGNAL DAMPING CAMOUFLAGE SYSTEM AND MANUFACTURING METHOD

[76] Inventor: Joseph A. Resnick, 3269 Rumblewood Pl., Sarasota, Fla. 34237

[21] Appl. No.: 17,322

[22] Filed: Feb. 11, 1993

Related U.S. Application Data

[63] Continuation of Ser. No. 631,873, Dec. 21, 1990, abandoned, which is a continuation-in-part of Ser. No. 216,426, Jul. 8, 1988, Pat. No. 5,163,504.

[51] Int. Cl.$^6$ .............. H01G 17/00; F21V 9/04; G02B 5/22; G21K 1/10
[52] U.S. Cl. .............. 342/11; 252/583; 252/584; 252/586; 252/587; 342/2; 342/3; 428/317.9; 428/402.24; 428/919; 523/137
[58] Field of Search .............. 252/583, 584, 252/586, 587; 428/402.2, 402.24, 317.9; 342/1, 2, 3; 523/137; 430/138

[56] References Cited

U.S. PATENT DOCUMENTS

| | | | |
|---|---|---|---|
| 3,575,871 | 4/1970 | Susi et al. | 252/587 |
| 3,620,888 | 11/1971 | Buzzell | 252/587 X |
| 3,814,156 | 6/1974 | Bachmann et al. | 411/930 X |
| 3,877,374 | 4/1975 | Cook | 102/700 X |
| 3,919,110 | 11/1975 | Vassiliades et al. | 428/402.24 |
| 4,024,318 | 5/1977 | Forster et al. | 428/519 |
| 4,058,477 | 11/1977 | Boller et al. | 252/299.68 |
| 4,104,176 | 8/1978 | Bidler | 252/12.2 |
| 4,287,243 | 9/1981 | Nielsen | 428/919 X |
| 4,307,169 | 12/1981 | Matkan | 430/138 X |
| 4,404,828 | 9/1983 | Blachford | 428/402.21 X |
| 4,424,911 | 1/1984 | Resnick | 116/206 X |
| 4,486,319 | 12/1984 | Jamison | 252/12.2 |
| 4,592,957 | 6/1986 | Dahm et al. | 428/402.21 |
| 4,601,967 | 7/1986 | Suzuki et al. | 430/138 X |
| 4,797,344 | 1/1989 | Nakahara et al. | 428/402.21 |
| 4,879,175 | 11/1989 | Ugro | 252/315.2 X |
| 4,918,317 | 4/1990 | Hess et al. | 430/138 X |

OTHER PUBLICATIONS

Robert R. Birge et al., "Two–Photon, $^{13}$C and Two–Dimensional $^1$H NMR Spectroscopic Studies of Retinyl Schiff Bases, Protonated Schiff Bases, and Schiff Base Salts: Evidence for a Protonation Induced * Excited State Level Ordering Reversal[1]," J. Am. Chem. Soc., vol. 109, No. 7, pp. 2090–2101 (1987).

Primary Examiner—Richard D. Lovering

[57] ABSTRACT

An electronic attenuation and camouflage device comprising a novel cooling device comprised of microspheres; an additional set of microspheres containing radar attenuating materials <RAM> capable of absorbing certain frequencies; and an additional set of microspheres containing electroreactive substances enabling color change of a structure to match background, all comprising structures or being placed in a matrix; a structure; a machined part; a coating; or a series of matrices, structures, parts or coatings, which combined structures enable concealment of an object.

15 Claims, 1 Drawing Sheet

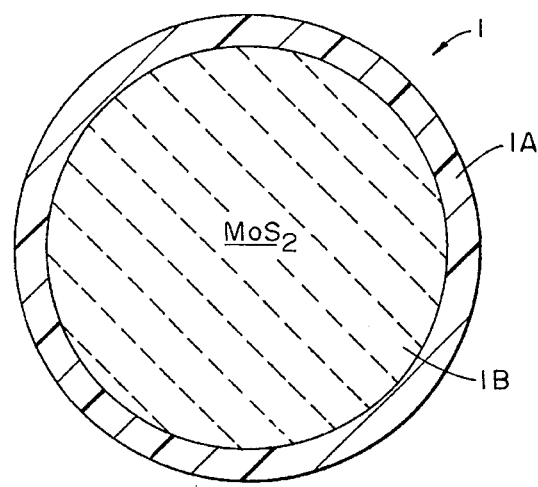
FIG. 1
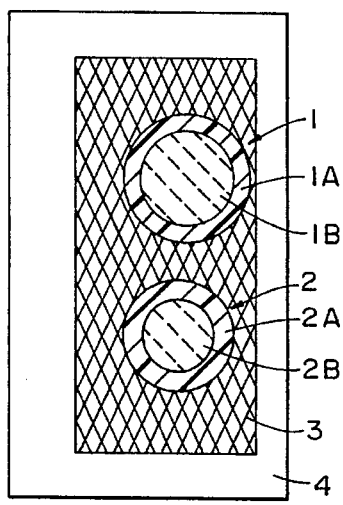
FIG. 2
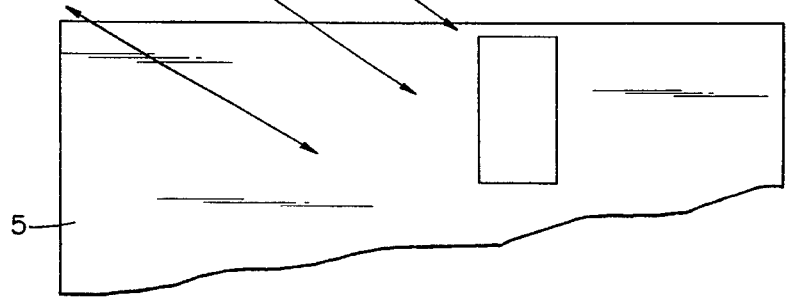

SIGNAL DAMPING CAMOUFLAGE SYSTEM AND MANUFACTURING METHOD

CROSS REFERENCE TO RELATED APPLICATION

The instant application is a continuation application of now abandoned U.S. patent application Ser. No. 07/631,873, filed Dec. 21, 1990, which is in turn a continuation-in-part application of U.S. patent application Ser. No. 07/216,426, filed Jul. 8, 1988, which issued as U.S. Pat. No. 5,163,504, entitled, "Container Warming and Cooling Device and Novel Building Material".

TECHNICAL FIELD

The instant and copending applications relate to the subject of attenuation of signals through use of electronic coupling and yielding materials, novel exothermic and/or exothermic conductive materials, and/or electronic camouflage systems. Combined systems enable i) reduction of designated electronic radar signals, IR, Lidar, and Sonar signatures, and/or ii) an electronic camouflage system enabling the color of a structure to be changed to match its surrounding and/or background. Combined systems, when applied to a structure, are design to obscure the object from, e.g., visual, aural, and/or electronic detection.

BRIEF SUMMARY OF THE INVENTION

This is a continuation-in-part of a co-pending application entitled, Container Warming and Cooling Device and Novel Building Material. In that regard this continuation-in-part is more specifically related to the aspect of the Novel Building Material, a novel substance more succinctly known henceforth as, "Electromagnetic Electronic Countermeasure Attenuation Device and Manufacturing Method Thereof" to which I have ascribed the nomenclature, "STEALTH RADEX", and concerning which combined substances I claim a Trade Mark.

A novelty of the instant invention comprises its ability to be used in the manufacture of, the application to or on, existing structures, or to be used as a composite in the manufacture of new structures or architectures. An additional feature of the instant device is its utility as a means of providing for the attenuation or dampening of specific microwave or radar frequencies as an electromagnetic, electronic attenuation device over a broad band of the electronic spectrum, more specifically frequencies in the range 3,000 to 30,000 Mega Hertz and more particularly, in the microwave frequency range of 20,000 to 25,000 Mega Hertz. A further feature of the combined apparatus is the feature enabling simultaneous color change of the object upon which the combined substances are applied. For example, an aircraft flying in a "blue sky" background may take on the approximate color of the background in which the object (aircraft) is moving through.

BRIEF DESCRIPTION OF THE DRAWINGS

FIG. 1 represents a cross-sectional view of a microsphere, 1, having a jacket or shell, 1A, made of polymer, and a core, 1B, comprised of $MoS_2$.

FIG. 2 represents a cross-sectional view of the microspheres, 1, 1A and 1B, together with microspheres, 2, having a shell made of monomer, 2A, and having a core, 2B, comprised of $FeO_2$ being suspended in a lattice, 3, which are painted in a polymeric carrier substance, 4, e.g., paint onto an aircraft wing structure, 5.

DETAILED DESCRIPTION

Through the course of my experiments with microspheres, more particularly the fabrication methods related to creation of a Container Tamper Detection Device, U.S. Pat. No. 4,424,911 incorporated herein by reference, I configured a number of different devices utilizing microspheres especially for utilization in particular modalities. Such devices include U.S. Pat. No. 4,424,911; and a bioremediation device known as "WAPED", Ser. No. 07/390,363, filed Aug. 7, 1989, now abandoned, incorporated herein by reference; and more recently the Original Application upon which this submission is based, which application Ser. No. 07/216,426, now U.S. Pat. No. 5,163,504 is also incorporated herein by reference.

SPECIFICATION

The microcapsules I used in past experiments and devices were of the type manufactured by KMS Industries, Ann Arbor, Mich., <now KMS Fusion, Inc.> and of the types based on the manufacturing methods of Wang, et.al, and of Kornfeld, et. al., all of which were described in the Original Application co-pending herewith, and which references are now included herein as if by entirety.

Recently, I designed a method of making miniature bubbles, or microspheres, by fixing hypodermic syringes to a lab stand in annular and linear configurations, i.e., I configured a method enabling placement of one hypodermic needle tip within another needle tip placing these at angles in juxtaposition.

A first, outer syringe contained a UV light-cured material, a <monomer> biopolymer, such as LITE TAG 370 which is available from Loc-Tite Corp. of Newington, Conn.; or PART #4484 available from Electro-lite Corporation of Danbury, Conn. A second, inner syringe contained the substance to be encapsulated, such as molybdenum disulfide or Retyn Scheyth Salts, which are available from Aldrich Chemical Company of Milwaukee, Wis., Custom Synthesis Group.

These syringes are of sufficient size and are configured so as to permit the second syringe to be placed within the first, comprising a novel assembly, so that the nozzles are equidistant yet spaced far enough apart so as to allow discharge of both materials simultaneously such that the material in the first syringe forms a shell (bubble) around the material in the second as it exits the orifice. After formation of a bubble containing the encapsulated material, $MoS_2$ for example, I allow the bubble to drop through a controlled airspace which is "flooded" with UV light of the required frequency and duration sufficient so as to cause liberation of the free radicals (monomer+photomultiplier) and subsequently "cures" the material, monomer or biopolymers, resulting in formation of a "shell" or crust on the outermost portion of the combined materials, now constituting in this configuration a novel building material; and particularly the Electromagnetic Electronic Countermeasure Attenuation Device which is an aspect of the instant petition. The method of manufacture as stated above should be considered illustrative rather than limiting, as any number of encapsulation methodologies could be used, such as those referenced earlier in this writing and/or in my prior submissions which are included herein by reference.

Likewise, the method of manufacture described above should be considered illustrative rather than limiting and in that regard easily accomplished by persons of reasonable skill in the art when utilizing any number of different encapsulation technologies.

After such manufacture, it is then possible to place the new material comprising the invention into a suspension comprising another substance (paint), such as polyurethane <paint>, and to then apply the combined substances, by an aerosol spray or some other such method, to the exterior of an existing structure, an automobile, for example, or other such vehicles as aircraft, seacraft, antennae, electronic equipment housings, etc. It is further possible to use this material as a composite in forming new structures comprised of composite materials, e.g., antennae, containers for protecting frequency-sensative components, etc., or entire vehicles, e.g., warships, submarines, aircraft or projectiles, etc.

Many obvious advantages are apparent with regard to having this new material made available. For example the material could be applied as a coating to the external portions of existing devices, aircraft, seacraft, etc., should it be desired that coated equipment be undetectable via conventional electronic modalities. Such could prevent loss of human life and hardware in combat situations, and could likewise prove to be practical in other situations where the object of the user would require unobserved entry to an area, or region, e.g., a combat zone, etc. which is usually protected by electronic surveilance devices, e.g., radar or sonar; or delivery of un-manned vehicles, e.g., rockets, into an area in a manner undetectable via conventional methods. A further use for a material of this nature could be application as an "insulation" barrier on the external portions of buildings: For example, this material could have been used to "protect" employees of the U.S. Department of State when the U.S. Embassy in Moscow USSR was being bombarded by microwaves.

In 1859 Kirchaf & Bunsen demonstrated that wavelengths of various sizes, shifting from blue (short) to red (long) in the spectrum, could be absorbed by various gasses and thus certain elements identified by means of a device which they invented, a spectroscope. For the purpose of this discussion the term, "wavelength", is synonymous to the term, "frequency", where high frequency equals a short wavelength and low frequency equals a long wavelength.

It has been well established in the literature that certain radio frequencies comprise wavelengths, and that wavelengths comprise a distance measured in the direction of propogation of a wave between two points in the wave that are characterized by the same phase of oscillation. A rather simplified, yet excellent description of this phenomenon is described in the Funk & Wagnalls New Encyclopedia #20, Library of Congress Catalog Card Number 72-170933, pps. 71–81.

Further, radio detection equipment, more specifically those operating in the microwave frequencies, e.g., Doppler Radar, Lidar, etc., produce linear signals which are progressively curved. For a more thorough explanation of this phenomenon see, "American Standard Definitions of Electrical Terms", published by the American Institute of Electrical Engineers, 1941, Sections 05.05.440; 65.11.555; 65.11.570, and 05.05.440 <attenuation>, and, 05.05.465 (a "damped" wave).

With such detection devices an oscillating frequency is produced which has a particular natural frequency. This frequency travels in the direction of an object until it couples with a structure resulting in the occurrence of the phenomenon of resonance, a "reflection" phenomenon. An example of this phenomenon can be illustrated when one drops a stone into a pool of still water causing minute waves to eminate outward from the point of interface with the stone and the water. If one were to have placed an pole into the water, with a portion extending above the surface, one could easily understand how the phenomenon is very similar to the way radio signals move through the air, with the exception that the radio waves are invisible.

With this example in mind it Is easy to understand that once the fundamental frequency couples with the object, resonance <"reflection"> results and oscillations of relatively large amplitude are produced as a direct result of this coupling. These large amplitude signals are reflected back to a receiver generally located at or near the point of generation of the fundamental frequency, which has been produced in sequences, or spaces sufficient to allow coupling, resonance and oscillation feedback to occur.

With this knowledge in mind, I set about to configure a means and method whereby it would be possible to eliminate coupling of a fundamental frequency to an object or structure thereby eliminating resonance ("reflection") making it possible to make it appear as though an object did not exist, and at very least the object would not provide feedback (oscillations) resonance to conventional electromagnetic sensing devices.

Prior to reducing my invention to practice, it occurred to me that it might be necessary to protect the elements I would be using as the yielding mechanism (absorber) from taking on too much electromagnetic energy or varying frequencies derived from various sources, e.g., the sun. I then determined that it might be desirable to be able to manufacture microcapsules and then to coat the microcapsules with certain reflective coatings which would prevent absorption of unwanted signals, e.g., UV, etc. This coating of the microspheres is easily accomplished using any number of various processes, such as those developed by Pittsburgh Plate Glass Industries, American Saint Gobain Glass, and Jeannette Glass Company, where the surface of the glass to be coated is "etched" providing sites where the coating, $FeO_2$, in this case, easily adheres. Other method of affixing reflective coatings could also be used, and these are considered to be easily accomplished by those possessing reasonable skill in the art.

A further aspect of the instant invention is the ability to cause the structure to which the material is applied to appear to "match" the background in which the object happens to be at any particular given moment. This is made possible by creating alternate microcapsules and filling them with different electro-reactive substances, e.g., silver oxide, iron oxide, etc., substances which possess the ability to "change color", from light to dark, as a result of having voltages imparted upon them. This technology is used in some buildings and automobiles, and even some houses as a means of providing screening from the sun's rays. Although this technology has been around for some time, I know of no use of encapsulated materials being used in combination with these photo-reactive coatings/materials for the purposes I have disclosed above in accomplishing a further aspect of the instant invention.

MODES OF CARRYING OUT THE INVENTION

In reducing my invention to practice, I manufactured a quantity of microcapsules approximately 70 um in size into which I placed powdered $MoS_2$, using the method described above (syringes, etc.). It should be noted, however that many different methods of manufacturing the microcapsules could have been utilized, e.g., Wang's process, or a retrofit of Dale Kornfeld's Rotary Reactor, etc., or for that matter any reference I may have previously submitted on PO Form 1029, and persons of reasonable skill in the art possess the requisite knowledge required to fabricate microspheres, now incorporated herein by reference.

In the Original Application related hereto <Ser. No. 07/216,426, now U.S. Pat. No. 5,163,504> I mentioned that certain substances, e.g., $MoS_2$, possessed the ability to resonate at certain radio frequencies, laser frequencies. For example, I cited a particular substance which was resonant to such frequencies; the compound molybdenum disulfide <$MoS_2$>. Although in the instant device I teach use of $MoS_2$, use of this compound should be considered illustrative rather than limiting, as other substances possess the ability to absorb, couple and yield, or absorb, radio frequencies as well.

In my earlier studies I determined that $MoS_2$ possessed the ability to couple with certain microwave frequencies in ranges from 1000 to 30,000 MHz (and 1.0 to 2.0 gigahertz) and acted as a "yielding mechanism", possessing an energy absorptive property. This was made apparent when I conducted certain experiments wherein I applied a coating of microcapsules containing $MoS_2$, by means of a polymer paint to a structure. After such placement an oscillating frequency was imparted upon the moving structure coated with the building material containing encapsulated $MoS_2$. For the experiment I coated a length of aluminum tubing material, an aerial approximately 2 meters in length and 3 cm in diameter, and placed this device at a predetermined distance away from a transmitter/sensing device, a conventional, hand-held radar gun, such as the "ROADRUNNER" model, a "K-Band" type radar device manufactured by Kustom Electronics, Inc., Overland Park, Kans., and suspended same from a pivitol axis which was likewise coated with the material.

During my first experiment I noticed that the structure (antenna) and the material coupling the radio frequencies ($MoS_2$) and the substance containing it (polymeric microspheres), actually became "hot" to the touch after extended exposure to frequency/oscillations which were being imparted <absorbed>. Elevation in temperature was observed during minimal time durations of less than 0.50 milleseconds. Upon observing this, it occurred to me that despite the fact that the experiment was successful in terms of accomplishing the yielding/absorption phenomenon, it would further be necessary to provide a means whereby the unwanted heat which was being generated by the coupling/yielding and absorption of the electromagnetic impulses could be moved away: This would assure that the combined composite would not be "pulled away" or would not "flake off" the structures to which it was applied. The method of removing this unwanted and potentially dangerous "heat" was to utilize my miniature heat exchangers as a means of directing the heat toward the frame of an automobile, for example, to internally placed metal trim components, or as a sub-system comprising heat exchangers and/or heat sinks. I described these miniature heat exchangers more fully as evidence previously submitted to the Examiner in case Ser. No. 07/216,426, now U.S. Pat. No. 5,163,504 as devices capable of providing a means of directing unwanted heat away from the structure which was coated with such material.

This novel cooling device <miniature heat exchanger> is more fully described in my Lab Journal Notes which were previously provided to the Examiner as evidence in case Ser. No. 07/216,426, now U.S. Pat. No. 5,163,504. Utilization of the heat exchangers in combination with the encapsulated $MoS_2$ is critical to the operability of the instant invention. For, without combined use of the miniature heat exchangers, the instant invention becomes "hot" resulting in separation of the polymer binder (paint) containing the $MoS_2$ from the surface to which it has been applied, resulting in peeling, flaking and/or cracking of the material.

Removal of heat from surfaces is accomplished through use of elements of the copending "Container Warming and Cooling Device and Novel Building Material", Ser. No. 07/216,426 which has been cited a number of times throughout this petition.

I claim:

1. A substance comprising a shell and, within the shell, a signal absorbing material, wherein said shell comprises a hollow microsphere and further wherein said signal absorbing material consists essentially of molybdenum disulfide.

2. The substance according to claim 1 wherein said hollow microsphere is made of monomers.

3. The substance according to claim 1 wherein said substance is incorporated in a coating of a device for attenuating electromagnetic waves to which said device is subjected.

4. The substance claim 1 wherein said substance is incorporated in a coating of an electronic yielding device.

5. The substance according to claim 1 wherein said substance is incorporated in a coating of a camouflage device.

6. The substance according to claim 1, said substance is incorporated in a coating of a device comprising a composite material comprising structures; said materials and structure possessing the ability to resonate or yield at frequencies in the visible, IR, LIDAR, RADAR, SONAR, and DOPPLER frequencies.

7. The shell of claim 1 containing a deuterated water.

8. The shell of claim 1 containing ammoniated water.

9. The substance according to claim 1 wherein said hollow microsphere is made of polymers.

10. The substance according to claim 1 wherein said hollow microsphere is made of UV-light curable material.

11. A method of using a substance as claimed in claim 1 comprising applying said substance to an object for reducing observability of said object.

12. The method of claim 11 where such method enables application in the form of a singular layer.

13. The method of claim 11 where such method enables application in multiple layers.

14. The method of claim 11 where such method enables application in the form of a matrix.

15. The method of claim 11 wherein said step of applying said substance to an object is performed by spraying said substance onto said object.

* * * * *